March 11, 1958  J. E. BORETZ ET AL  2,826,076
AUTOMATIC SAMPLING DEVICE
Filed Aug. 17, 1954  6 Sheets-Sheet 1

FIG. 1

INVENTOR
JAMES A. BOLTON
JONATHAN E. BORETZ
BY JOHN B. WILLIAMS
ATTORNEY

March 11, 1958 J. E. BORETZ ET AL 2,826,076
AUTOMATIC SAMPLING DEVICE
Filed Aug. 17, 1954 6 Sheets-Sheet 3

INVENTOR
JAMES A. BOLTON
JONATHAN E. BORETZ
BY JOHN B. WILLIAMS

ATTORNEY

March 11, 1958 J. E. BORETZ ET AL 2,826,076
AUTOMATIC SAMPLING DEVICE
Filed Aug. 17, 1954 6 Sheets-Sheet 5

INVENTOR
JAMES A. BOLTON
JONATHAN E. BORETZ
BY JOHN B. WILLIAMS

ATTORNEY

United States Patent Office 2,826,076
Patented Mar. 11, 1958

2,826,076

AUTOMATIC SAMPLING DEVICE

Jonathan E. Boretz, Glen Rock, N. J., and James A. Bolton, Darien, and John B. Williams, Greenwich, Conn., assignors, by mesne assignments, to the United States of America as represented by the United States Atomic Energy Commission Application August 17, 1954, Serial No. 450,416

11 Claims. (Cl. 73—422)

This invention relates to automatic sampling devices and more particularly to an apparatus for continuously selecting and analyzing the chemical and physical properties of samples of material.

It is often desirable to analyze continuously and automatically, selected physical or chemical properties of materials. Industrial applications frequently require that material being manufactured be constantly monitored at predetermined intervals by selecting samples thereof, to ascertain whether any change has occurred during the processing of the product being manufactured. For example, certain chemical processes wherein a compound is being manufactured require that an analysis of the constituents comprising the compound be made at designated intervals to provide a quality control of the process. Accordingly, such analysis may consist of conventional colorimetric measurements of the product wherein a measured amount of product is placed in a chemically clean receptacle, conventional colorimetric testing substances are added thereto in measured amounts, and the resultant analytical colors obtained are detected by photocells or other light measuring means whereby various percentages of substance present in a composition of matter may be ascertained from the hue or strength of the detected colors.

In addition to control of processing, it is often expedient to sample the radioactivity of a material at designated intervals in order that any increase of the radioactivity therein may be quickly detected. For example, the water fed to boilers in atomic energy installations must be analyzed for dangerous increases in radioactivity, or the cooling water in a reactor must be sampled to determine when it has become excessively radioactive. Furthermore, analysis of the sewage from hospitals should be made at intervals to prevent eventual contamination of the public water supply system by addition of radioactive waste products in the hospital sewage.

Previously, in both such processing and radioactivity control functions, the various steps of sampling have been performed by hand, requiring constant attendance of an operator or at least that he be present at designated sampling times. Furthermore, such sampling has required that the containers used therefore be chemically clean and, in the case of activity sampling, free from radioactive material. Such requirement necessitates scrupulous and troublesome cleansing of the receptacle if it is to be used repeatedly, or the disposal of a relatively expensive laboratory receptacle after a single use.

The present invention contemplates a novel apparatus for automatic sampling and analysis of a material whose selected physical or chemical properties are to be monitored. Accordingly, a continuous length of reeled, metallic tape is provided which is advanced in step-wise, intermittent fashion past a series of stations, wherein the tape is successively indented to form receptacles therein. The receptacles are then filled by a dispenser with material to be analyzed, heated if necessary, to drive out moisture from the material being sampled, surveyed by analyzing devices, and then reeled up on a disposable reel.

Accordingly, it is an object of the invention to provide an apparatus for both automatically sampling discrete increments of material and automatically analyzing the chemical or physical characteristics of each sample.

It is another object of the present invention to provide a plurality of disposable receptacles integrally attached to each other in a belt-like configuration so as to facilitate the handling and disposition of incremental samples of material having characteristics to be analyzed.

A further object of the invention is to provide a material sampling mechanism for continuously determining the presence of selected characteristics or properties of such samples which allows intermittent unattended sampling.

Another object of the invention is to provide material sampling apparatus for analyzing chemical or physical properties, and in particular the radioactivity, of selected samples in which the elapsed time interval between the withdrawal and the analysis of a sample is minimized and maintained at a constant difference between successive sample selections.

For a better understanding of the invention, together with other and further objects thereof, reference is made to the following detailed description taken in connection with the accompanying drawings, in which.

Figure 1:
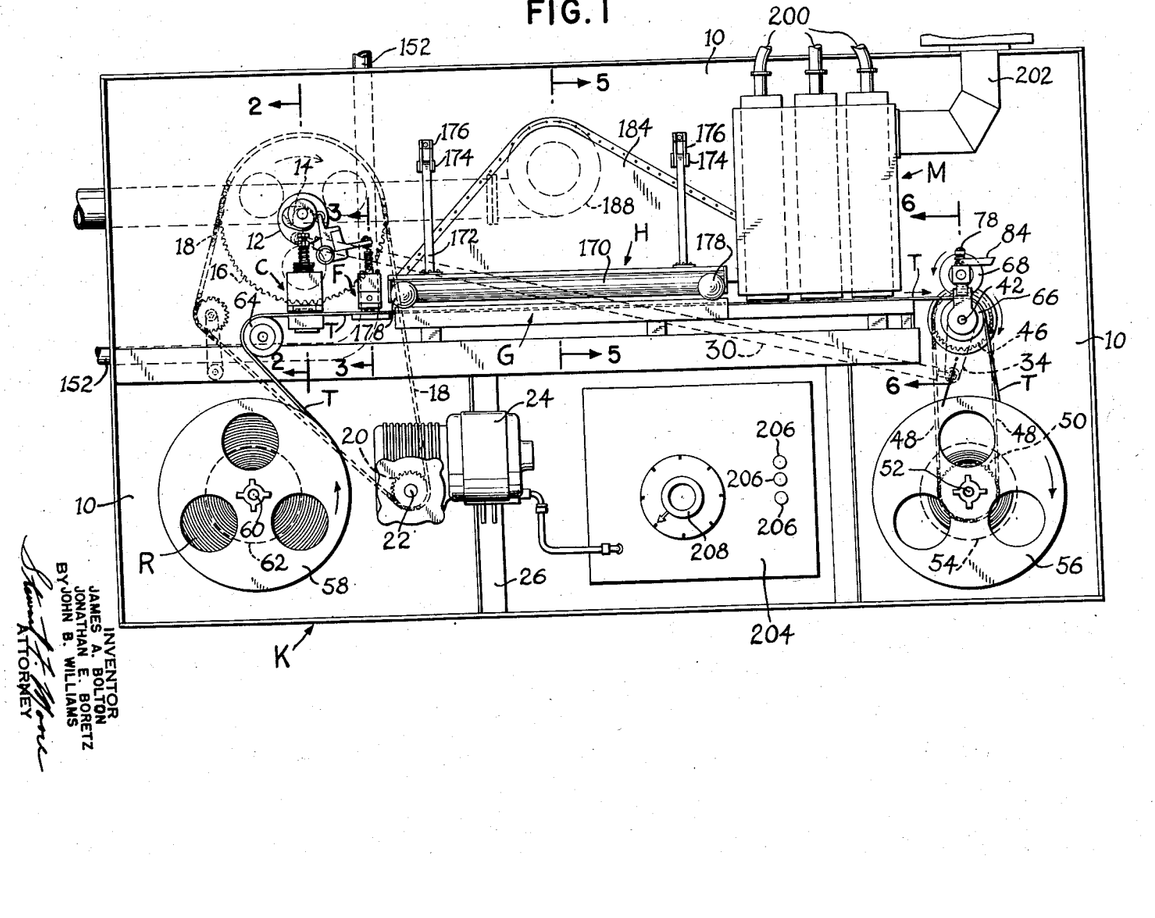
Fig. 1 is a side elevation of the automatic continuous sampling machine.
Figure 4:
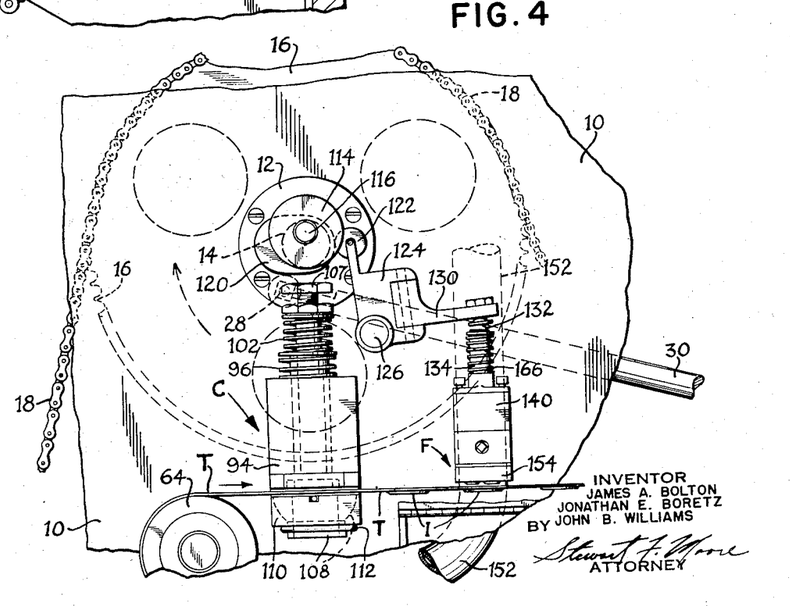
Fig. 4 is a detailed side elevation of the indentation or embossing mechanism and the fluid depositing device.
Figures 6, 7:
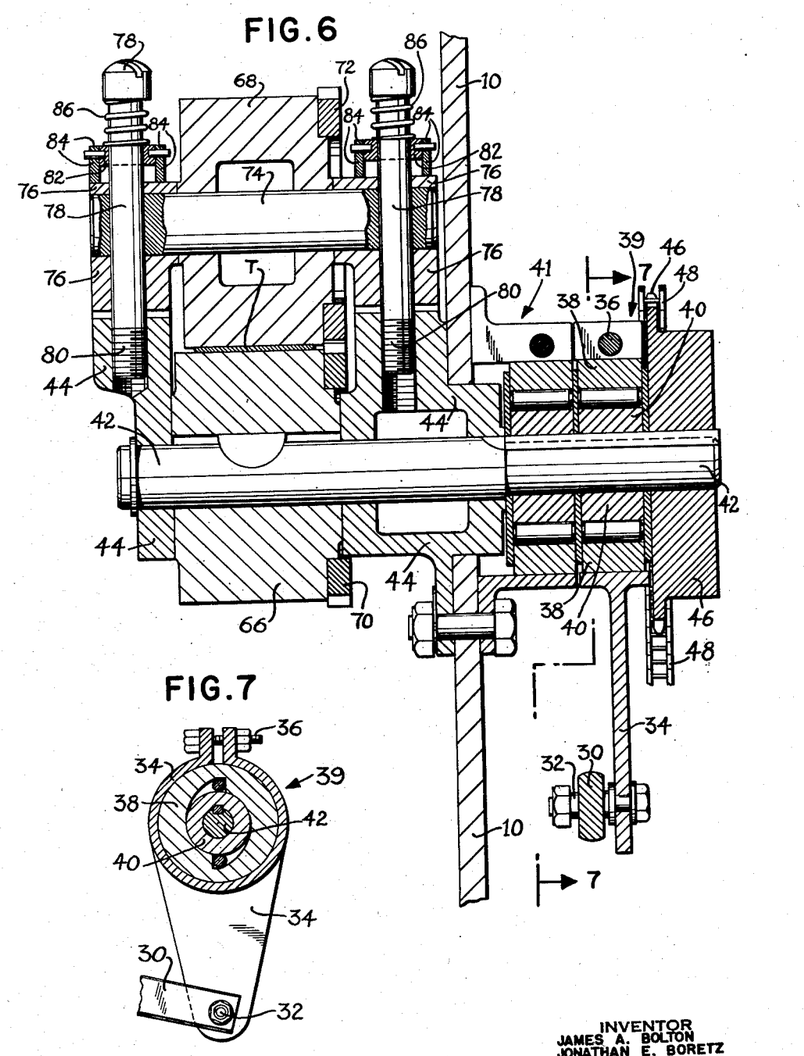
Fig. 6 is a sectional end elevation of the intermittently actuated tape pulling and flattening mechanism.
Fig. 7 is a sectional side elevation of the tape pulling actuating arm, taken on line 7—7 of Fig. 6.

Referring now to the drawings, the preferred embodiment of the automatic continuous sampling machine comprises a suitable frame or housing K, shown in Fig. 1, provided with a vertical supporting plate 10 to which is secured a suitable bearing bracket 12 (Figs. 1, 2 and 4), rotatably supporting a shaft 14 which has a sprocket 16 mounted thereon. The sprocket 16 is driven by means of a chain 18 from a sprocket 20 mounted on a shaft 22 protruding from a suitable variable gear reduction motor 24, secured to an upright member 26 of frame K (Fig. 1). A crank stud 28, secured to sprocket 16, has a connecting rod 30 pivotally fastened to one end thereof. The other end of connecting rod 30 is pivotally attached to stud 32 which is held by the free end of an arm 34 (Figs. 1, 6 and 7). Arm 34 is clamped by means of a bolt 36 to an outer member 38 of a conventional, one direction roller clutch 39, such as a "Hilliard" clutch. The outer member 38 engages with an inner member 40, which is keyed to a horizontal shaft 42 (Fig. 6) rotatably supported by a suitable bearing valve 44, secured to the vertical supporting plate 10. A clutch 41 similar in configuration to clutch 39 and adjoining thereto is keyed to shaft 42 to provide an adjustable, stabilizing drag.

Attached to shaft 42 is a sprocket 46 which is connected to a sprocket 50 by means of a chain 48. Sprocket 50 is loosely mounted on a shaft 52 and is rotatably supported by a suitable bearing bracket (not shown) fastened to the vertical supporting plate 10. Sprocket 50 has its hub coupled to a conventional slip clutch 54 which may be of the RLH type, manufactured by the Buffalo Machine Company. Shaft 52 has mounted thereon both slip clutch 54 and also a two-flanged, adjustable tape receiving wheel 56 (Fig. 1) which is employed for the purpose of receiving and winding up the used end of a tape T, which is pulled from another two-flanged, adjustable tape wheel 58. Compensation for the constantly increasing lineal speed of the tape passing through the machine, due to the increasing radius of the winding drum, is provided by driving tape receiving wheel 56 at a speed in excess of that required, and then slipping the wheel by means of slip clutch 54.

Tape drum 58 is mounted on a horizontal shaft 60 and also coupled to a slip clutch 62 which is in contact with a stationary bearing hub (not shown) projecting from plate 10 in order to create sufficient drag or tension to prevent the tape from unwinding itself. The slip clutch 62 may be of the same RLH type as the clutch 54 mentioned above, if desired.

The tape T is preferably metallic in composition and fabricated from a metal which is substantially non-reacting with the sampled material. For most applications, an aluminum tape may be employed, but in instances where the physical or chemical properties of a reacting substance is to be detected, a stainless steel or coated heavy paper tape may be utilized if desired.

The wound, fresh tape is led from a reel R on tape wheel 58 over an idler roller 64 and through a cup-forming or indentation device C, and guided beneath an automatic fluid depositing device F. The tape is further led over a guide wheel arrangement G beneath a radiant heating and evaporating device H and also beneath a number of suitable radiation monitoring units M to engage with a pair of feed rollers 66 and 68 (Fig. 6). These rollers are utilized to pull the threaded tape intermittently from the reel R over the idler roller 64.

Rollers 66 and 68 also serve as flattening means for the indentations or depressions made in tape T by the cup-forming device C in order that the tape can be reeled smoothly onto the tape receiving wheel 56. A smaller volume of used tape is thus provided for future handling and disposition. Roller 66 fastened to vertical shaft 42 is intermittently rotated through arm 34, connecting rod 30 and crank stud 28. Fastened to one side of roller 66 is a gear 70 which meshes with a gear 72 secured to the side of roller 68 for imparting intermittent driving motion thereto. Roller 68 is rotatably mounted on a shaft 74 which is supported by a pair of bearing blocks 76, each of which is yieldingly mounted on a vertical guide rod 78 which also slidingly protrudes from the end of shaft 74.

The lower end of each rod 78 is provided with a threaded portion 80 which is securely held in a hole of the bearing bracket 44. A compression block 82 having a suitably shaped release fork 84 pivoted thereto, slidably engages the upper portion of each of the vertical rods 78. Rods 78 each have a tension spring axially mounted thereon and disposed between the head of each rod and top surface of each compression block 82 so as to assert a downward pressure on each bearing block 76 when release forks 84 are in a lateral position. The necessary pressure is thus transmitted to roller 68 to effect a flattening of the indentations I on the tape T as it passes through rollers 66 and 68 prior to being rolled up on the receiving wheel 56.

Indentations are pressed into the tape T by the cup-forming or indentation device C as the tape intermittently comes to rest beneath it. Due to the intermittent motion of the tape, the indentations I are pressed evenly spaced and appear on the tape as indicated in Fig. 2A. A sufficient indentation depth for sampling purposes is approximately one-sixteenth inch. However, any suitable depth may be achieved by selection of die members.

Figure 2:
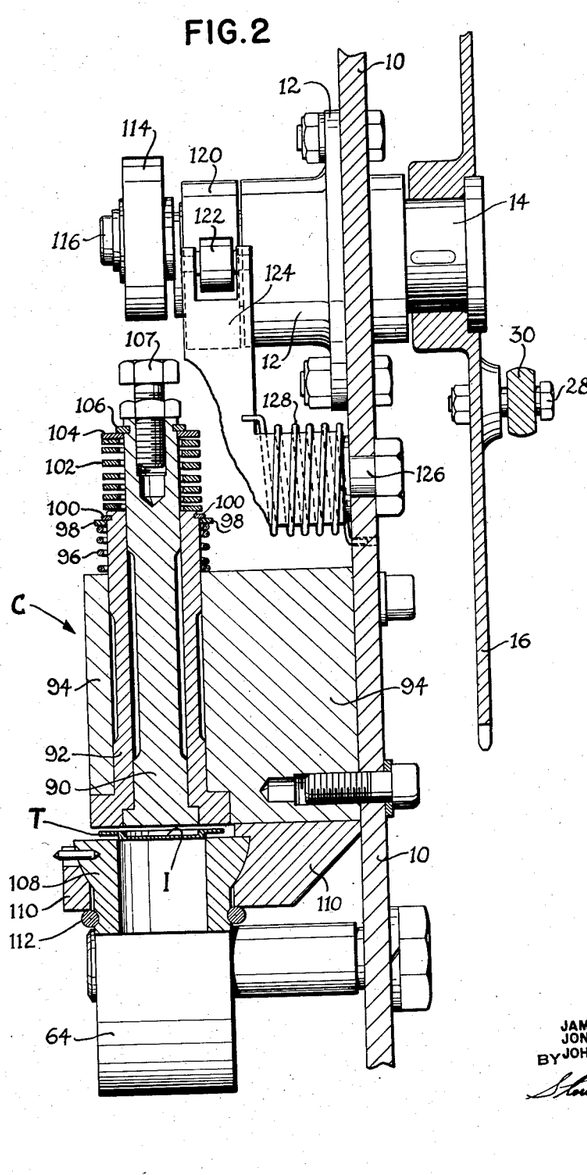
Fig. 2 is a sectional end elevation taken on line 2—2 of Fig. 1 illustrating the automatic cup forming or indentation mechanism.
Figures 2A, 5, 8:
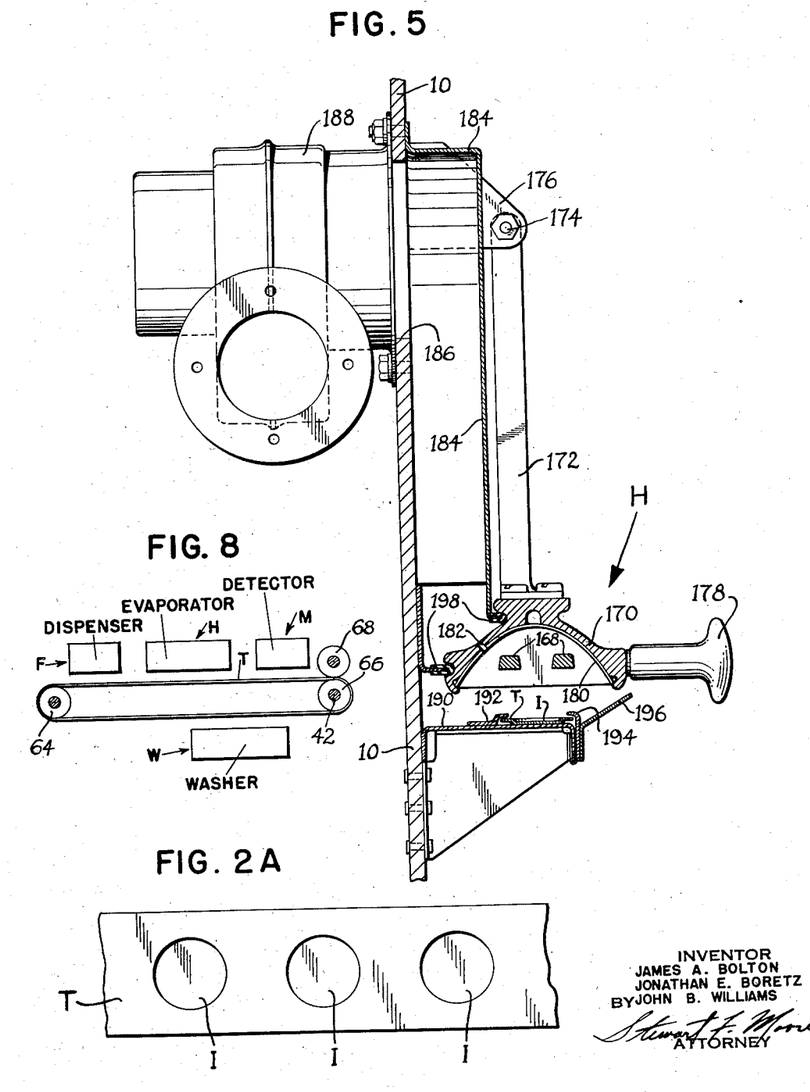
Fig. 2A is a plan view of a portion of a tape illustrating these indentations made in the tape.
Fig. 5 is another sectional end elevation taken on line 5—5 of Fig. 1 illustrating the heating and evaporating device.
Fig. 8 illustrates diagrammatically a modfication of the invention.

The indentation and cup-forming device C shown in Fig. 2 has a vertical plunger 90 slidably supported in a vertical clamp and guide sleeve 92, which in turn is slidably supported by a guide bracket 94 secured to the vertical support plate 10. The guide sleeve 92 is held in its normal upward position within the guide bracket 94 by a spring 96 surrounding the upper portion of the sleeve, which is confined to the top surface of the guide bracket 94 by a washer 98 and retaining ring 100. The plunger 90 is held in its normal upward position within the sleeve 92 by means of a suitable spring 102 axially positioned between the upper end of sleeve 92 and the washer 104 secured to plunger 94 by a retaining ring 106. The top end of plunger 94 is provided with an adjustable stud 107.

Beneath the plunger 90 and clamping sleeve 94 is located a suitable die 108 which is seated in a die supporting member 110 and held in place by snap ring 112 to permit ready removal or replacement of the die. Die supporting member 110 is suitably secured to the lower face of guide bracket 94.

The plunger 90 and the guide clamp sleeve 92 are intermittently actuated by means of a disc 114 pivotally attached to a crank pin 116 projecting from the end of the shaft 14. As the crank pin 116 approaches its lower position during a portion of each revolution of the shaft 14, the disc 114 contacts the stud 107 projected from the top end of plunger 90 and presses the latter downward onto and into tape T, which at that moment is at rest between the plunger 90 and the die 108. The downward movement of the plunger in conjunction with the female stationary die effects a cup-shaped indentation in the tape T. The depth of the indentation may be varied by adjusting the stud 107 on the upper end of plunger 90. As spring 102 is heavier and stronger than spring 96, downward movement of plunger 90 causes sleeve 92 to also move downward and contact the top edges of the tape T, thus preventing shifting of the tape during indentation action of the plunger.

As soon as the disc 114 disengages from the plunger stud 107, the springs 96 and 106 lift the clamping sleeve as well as the plunger out of contact with the tape and up to the normal upmost position, as illustrated in Fig. 2.

Rearwardly disposed to indentation device C is fluid depositing device F, so spaced with respect to the indentation device C that a discrete indented portion of the tape will lie beneath the fluid depositing device when forward motion of the tape has been halted momentarily to allow indentation thereof by indenting device C. The fluid depositing device F is actuated by a suitable cam 120 mounted on the shaft 14. Cam 120 is in continuous contact with a cam roller 122, which is loosely pivoted to the free end of an arm 124 and pivotally supported by a suitable stud 126 held by a vertical plate 10. The hub of the arm 124 is provided with a tension spring 128 (Fig. 2) for keeping the cam follower 122 in continuous contact with cam 120.

Figure 3:
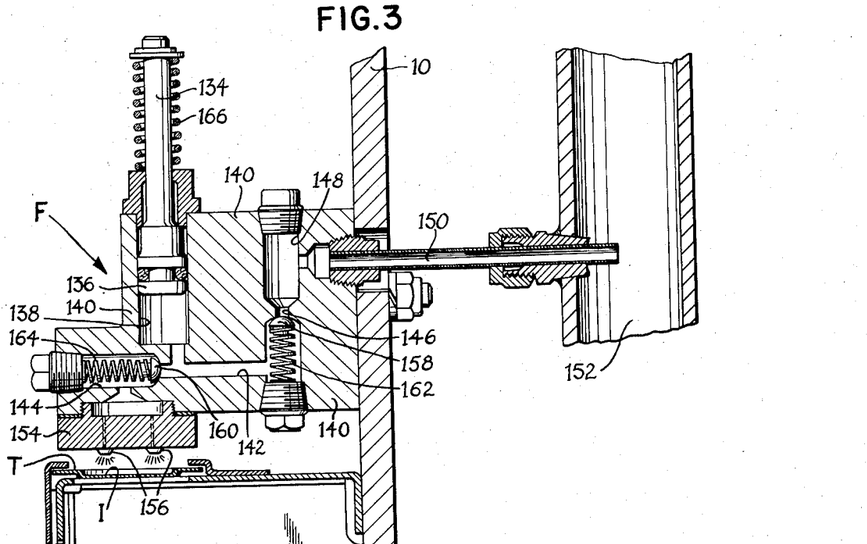
Fig. 3 is also a sectional end elevation taken on line 3—3 of Fig. 1 illustrating the automatic fluid depositing device.

A lug 130, adjustably attached to arm 124, has on the end thereof a suitable stud 132 mounted above and lying in register with the upper end of a vertical plunger 134. As shown in Fig. 3, one end of plunger 134 has a piston 136 extending into a vertical cylindrical bore 138 of a valve housing 140 of the fluid dispensing device F. The bottom end of cylindrical bore 138 is connected to a fluid dispensing duct 144 and a fluid receiving duct 146 by means of a duct 142. Duct 146 is connected to a fluid receiving chamber 148 which is connected to a suitable supply pipe 152 by a tube 150. Fluid dispensing duct 144 is also connected to a dispensing head 154, secured to the underside of housing 140 and provided with suitable nozzle 156, located above and within the area of indentations I when the latter is resting momentarily therebelow. The fluid receiving chamber 148 and the duct 142 are separated by a conventional check valve 158, and the fluid dispensing duct 144 and duct 142 are separated by another check valve 160. Both valves 158 and 160 are normally held in closed position by tension springs 162 and 164, respectively.

The upper portion of the vertical plunger 134 and piston 136 is also surrounded by a tension spring 166 employed for the purpose of keeping the piston normally in its uppermost position within the cylindrical bore 138. When, during the continuous rotation of shaft 14, the roller 122 of arm 124 rides onto the high portion of cam 120, the arm pivoted on stud 126 causes lug 130 to swing downward so that the stud 132 contacts the upper end of plunger 134 forcing it downward. Downward movement of plunger 134 and attached piston 132 creates a pressure which causes check valve 160 to open and force fluid resting in bore 138 and duct 142 into dispensing chamber 144 and dispensing head 154, from where it is sprayed into the indentations I of tape T through nozzles 156. Further rotation of cam 120 allows roller 122 to ride onto the low portion thereof causing arm 124 to raise lug 130 upwardly. Plunger 134 and attached piston 132 also move upwardly due to the reaction of spring 166. When the pressure of the piston upon the fluid and duct 142 ceases, valve 160 closes and the upward movement of the piston in bore 138 creates a vacuum therein as well as in duct 142.

This vacuum causes valve 158 to open and permit fluid from the receiving chamber 148 to enter into duct 142 and also into bore 138. As soon as the vacuum is replaced by liquid, valve 158 closes again and upon the next downstroke of the piston, fluid again is sprayed into the next indentation in the manner described above.

By utilizing a small volume pump of the type described, in which there is no large reservoir for holding fluid awaiting test, the time differential between the instant of sampling and the instant of detection is held to a minimum. Thus almost instantaneous testing of a chosen material is effected.

After the fluid is deposited in the successively passing indentations I, the tape T in intermittent or stepwise movements, then passes beneath the radiant heating and evaporating device H (Figs. 1 and 5), where the water or any other fluid acting as a carrier for substances to be examined is evaporated. Evaporation of the water is desirable as it otherwise acts as a shield for the radiation and hinders efficient detection of radioactivity by monitoring device M. Evaporating device H may comprise a plurality of heating elements 168, such as "Chromolux heaters" which are arranged and mounted in a suitable cover or hood 170. Brackets 176 secured to the vertical frame plate 10 provide supports about which cover or hood 170 may be pivoted by means of studs 174 and lugs 172. Hood 170 is also provided with a pair of knobs 178 to facilitate the lifting thereof if desired. To increase heating efficiency, the hood also may be lined with a suitable deflector plate 180 as illustrated in Fig. 5.

Hood 170 is furthermore provided with a slot-like opening 182 which forms a connection to a suction chamber 184 secured to the vertical plate 10. Fan 188 secured to the rear side of vertical plate 10 creates a suction through opening 186 to facilitate removal of moisture-laden air beneath the hood 170 during the evaporation process. In general, the density of the sampled material is thereby increased by removing all volatile products therefrom.

When passing beneath the radiant heating and evaporating device H, the tape T is supported by a suitable bracket plate 190, and guided by laterally adjustable side rails 192 and 194. It is understood that tape of any suitable width may be utilized by merely employing reels having hubs of different widths and adjusting the spacing of side rails 192, 194 to accommodate the different widths. To facilitate threading and alignment of the tape T, side rail 194 is pivotally secured to the front edge of the bracket plate 190. Guide rail 194 also carries a suitably shaped deflector plate 196 designed to concentrate the heat beneath the hood 170 to aid in the radiant heating process. To prevent the loss of suction, the lower edges of suction chamber 184 which contact the hood 170 are provided with suitable shields 198.

Monitoring device M, beneath which the tape passes after leaving the evaporating and heating apparatus H, comprises a plurality of radiation measuring tubes, which are designed to provide means for detecting the amount of radiation in the samples passing therebeneath. The measuring tubes may comprise a plurality of scintillation type counters; for example, one or more of the tubes may be alpha counters, while another may be a beta or gamma counter of the type manufactured by Nuclear Instrument Co. Of course, ionization chambers or a Geiger counter may be provided if desired. Adequate cooling for the counters is provided by means of an air intake and conducting duct 202 which is connected (not shown) to the intake of suction blower 188. The counters, when connected by means of cables 200 to suitable measuring devices will provide quantitative and qualitative measurements of the amount of radioactivity in each sample. They may also be used to operate alarms or any suitable control system which may be of the type which provides an alarm when the radioactivity of the material being tested has gone beyond a predetermined limit.

Figure 9:
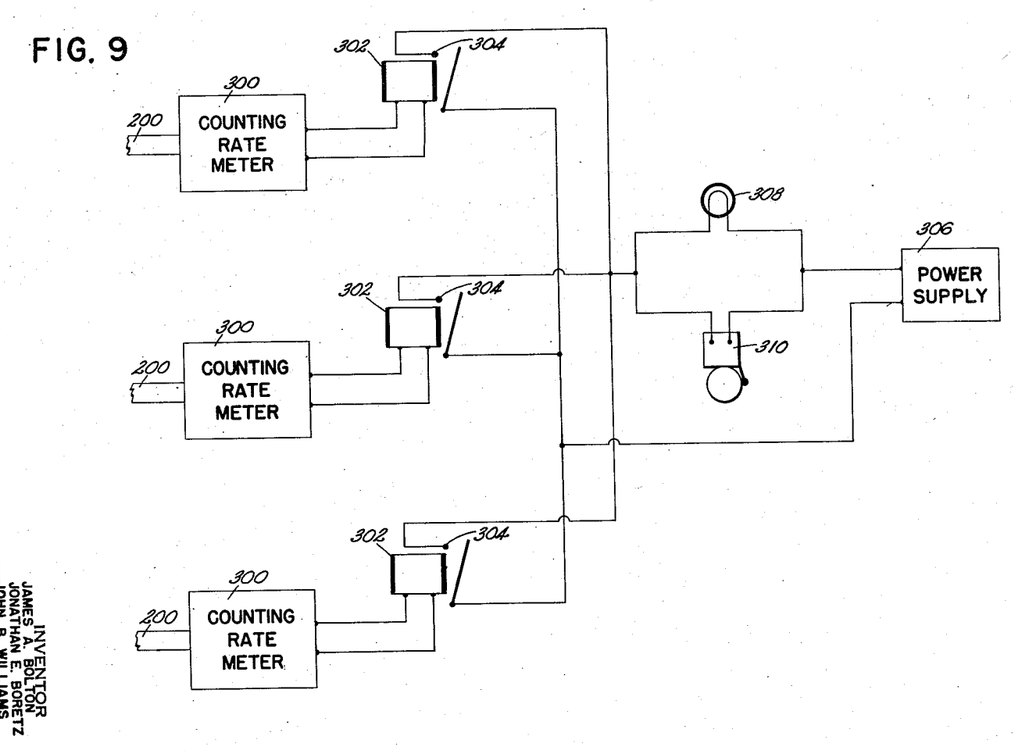
Fig. 9 is a block schematic diagram of an alarm system suitable for use with the monitoring device of Fig. 1.

A suitable alarm system is shown in Fig. 9. Cables 200 are each connected to a conventional counting rate meter 300 which, in turn, are connected to associated indicating meter-type relays 302. The normally open contacts 304 of relays 302 are connected in parallel with each other, and in series with a suitable power supply 306 and a parallel connected lamp and buzzer 308, 310. Thus, when any one of the counters of monitoring device M detects an increase in radioactivity, the resulting rate of increase in counts causes its associated counting rate meter 300 to energize the indicating meter relay 302 to which it is connected, thereby closing contacts 304. Closure of any of the parallel contacts 304 completes the alarm circuit and allows lamp 308 to light and buzzer 310 to sound, thus indicating that the radioactivity of the material being tested has exceeded a predetermined limit.

The activation and operation of the entire unit is controlled by control box 204 which has suitable start, stop and jogging controls 206 and a speed control 208 therein which may be a variable or auto-transformer for varying the line voltage of motor 24. Also, if desired, suitable timing circuits may be contained in control box 204 for causing the mechanism to be energized only at preselected intervals. For example, it may be desirable to sample certain waters only once per hour, rather than having continuous sampling.

The automatic sampling machine is set into operation by pressing the start button from the group of push buttons 206 in order to connect a source of electrical energy thereto, and then adjusting auto-transformer 208 to set motor 24 at a speed sufficient to advance tape T at a desired rate. Motor 24 through suitable reduction gearing then actuates sprocket 20 which in turn drives sprocket 16, the main driving sprocket. Rotation of sprocket 16 actuates reciprocating shaft or rod 30 which in turn drives the one-direction roller clutch 39. Engagement of the clutch 39 for each forward stroke of reciprocating rod 30 advances tape T, in step-wise, intermittent fashion, an incremental length during the period of clutch engagement, causes one indentation I in tape T to be crushed between rollers 66 and 68, and also rotates reel 56 an incremental amount by means of driving chain 48. Rotation of sprocket 16 also causes tape T to be indented once each revolution thereof by actuating die member 90 by means of rotating cam 120. Similarly, each indentation is filled with sampled liquid at the proper instant from the dispensing pump F by rotating cam 120 and plunger arm 124. Of course the respective positions of cam 114 and 120 are adjusted previous to operation of the apparatus so as to provide proper sequential operation of indentation device C and dispensing pump F.

Actuation of the starting push button also connects an electrical energy source to radiant energy heaters 168, blowers 188, and places the detecting and measuring apparatus connected to radiation detectors M in operating condition. Thus, as motor 24 rotates, tape T is constantly unreeled from reel 58 and indented by indentation device C. The indentation is filled by dispensing pump F, the moisture from the filled indentation is evaporated by heater H, and the radioactive material in the residue thereof is constantly detected by radiation detectors M. The indentation is then pressed out of the tape T, and the flattened and expendable used tape is wound on reel 56 to be discarded when convenient.

In sampling applications where the normal level of radio-activity of a sample is relatively high and it is only desired to detect sudden increases of radioactivity into high activity levels, the tape need not be discarded after use, but may be prepared for re-use by washing. As a large percentage of the contaminant is thereby washed off, any radioactive residue remaining accounts for only a low percentage of the normal activity level of the sample being tested. In such applications, the tape need not be reeled, but may be in the form of an endless belt on which small amounts of sampled material may be placed; or, if desired, the belt may have permanent pre-indented depressions formed therein. As shown in Fig. 8, the endless belt in such instances may be mounted on suitable pulleys and advanced by means of rollers 67, 68, and idler roller 64. A wash bath W is suitably positioned so that the tape passes therethrough on its return trip after passing beneath the radiation detectors M. Of course, indentation device C is rendered inoperative when a pre-indented tape is utilized.

If desired, the activity of solid material may be measured automatically by the apparatus. It is preferable, in such uses, to first comminute the material to be sampled, and then deposit the material by means of a suitable dispenser into the indentations of the tape T. The dispenser may be similar to dispenser device F, but modified for handling solid material. When solid material is sampled, the drying step may be eliminated, if desired.

Although an automatic sampling device for detecting the radioactivity of material is shown, yet it is understood that selected properties of a chosen material sample other than the physical property of radioactivity may be detected, and quantitatively and qualitatively measured by the invention. For example, the sampler may be adapted to analyze by colorimetric measurements the chemical constituents of a material by substituting photoelectric or other suitable detectors in place of the radiation detector M. The material to be analyzed with suitable colorimetric testing substance previously added thereto is placed in the tape indentations by fluid dispenser F and conveyed to the detectors where the substance is analyzed without the application of heat from drier H.

While the present invention has been disclosed by means of specific illustrative embodiments thereof, it would be obvious to those skilled in the art that various changes and modifications in the apparatus may be made without departing from the spirit of the invention as defined in the appended claims.

We claim:

1. Apparatus for continual sampling of material and detecting selected properties thereof comprising means for selectively sampling discrete portions of material from a supply of said material, a detector for detecting a selected property of said sampled material, a plurality of receptacles arranged in belt-like fashion, each of said receptacles being adapted to receive one of said samples, means for continuously conveying said filled receptacles past said detectors so that the selected property of said samples may be detected, and rotatable storage means for storing said receptacle belt after said samples have been subjected to said detector, said conveying means having indexing means operatively connected to said rotatable storage means for advancing said receptacle belt in step-wise fashion at predetermined intervals.

2. Apparatus for continual sampling of material and detecting selected properties thereof, comprising means for selectively sampling discrete portions of material from a supply of said material, a detector for detecting a selected property of said sampled material, means for continuously conveying said samples past said detector so that the selected property of said samples may be detected, said conveying means including a continuous strip of receptacle-forming material, and means for indenting said strip at spaced intervals to form receptacles therein, said sampling means including means for filling said indentations with said discrete portions of sampled material.

3. Apparatus for continual sampling of material and detecting selected properties thereof comprising means for selectively sampling discrete portions of material from a supply of said material, a detector for detecting a selected property of said sampled material, a continuous strip of receptacle-forming material, means for indenting said strip to form receptacles therein, said sampling means including means for filling said indentations with said samples of discrete portions of material and conveying means having indexing means for advancing said continuous strip in step-wise fashion at predetermined intervals, said indexing means including means for sequentially actuating said sampling means and said indenting means in synchronism with the movement of said continuous strip of material so that said receptacles are formed in said strip of material and filled by said sampling means in proper timed relationship.

4. Apparatus for continual sampling of material and detecting selected properties thereof comprising means for selectively sampling discrete portions of said material, at least one detector for detecting at least one selected property of said sampled material, means for continuously conveying said samples past said detectors to detect selected properties of said samples, said conveying means including a continuous strip of receptacle-forming material, means for indenting said strip at spaced intervals to form receptacles therein, said sampling means including means for filling said indentations with said discrete portions of sampled material, and adjustable guiding means for guiding said continuous strip of receptacle-forming material past said receptacle indenting means, said sampling means, and said detector, in that order.

5. Apparatus for continual sampling of liquid material and detecting selected properties thereof comprising a continuous tape adapted to have depressions impressed therein, indenting means for impressing depressions in said tape at spaced intervals, means for sampling selected volumes of said liquid material from a continuously flowing supply thereof, said sampling means including a dispensing pump for filling each depression with said selected volume of liquid sample, at least one detector for detecting at least one selected property of each of said samples and means for advancing said tape past said indenting means, said sampling means, and said detector in that order.

6. Apparatus for continual sampling of material and detecting selected properties thereof comprising means for selectively sampling discrete portions of said material, a detector for detecting a selected property of said sampled material, means for continuously conveying said samples past said detector so that a property of said material may be detected, said conveying means including a continuous strip of receptacle-forming material, means including a spring actuated die for indenting said strip at spaced intervals to form receptacles therein, said sampling means including means for filling said indentations with discrete portions of sampled material, and adjustable guiding means for guiding said continuous strip of receptacle-forming material past said die so that receptacles are indented in said strip by said die at predetermined spaced intervals.

7. Apparatus for continual sampling of material and detecting selected properties thereof comprising cam-operated means for selectively sampling discrete portions of material from a supply of said material, a detector for detecting a selected property of said sampled material, a continuous strip of receptacle forming material, cam operated means for indenting said strip to form receptacles therein, said sampling means including means for filling said indentations with said samples of discrete portions of material and conveying means having indexing means for advancing said continuous strip in stepwise fashion at predetermined intervals, said indexing means including selectively positioned cams for sequentially actuating said cam-operated sampling means and said cam-operated indenting means in synchronism with the movement of the continuous strip of material so that said receptacles will be formed in said strip of material and filled by said sampling means in proper timed relationship.

8. Apparatus for continual sampling of material and detecting selected properties thereof comprising means for selectively sampling discrete portions of material from a supply of said material, a detector for detecting a selected property of said sampled material, a continuous strip having receptacles indented therein at spaced intervals, each of said receptacles being adapted to receive one of said samples, means for continuously conveying said filled receptacles past said detector so that the selected properties of said samples may be detected by said detectors, rotatable storage means for storing said receptacle strip after said samples have passed said detector, said rotatable storage means being driven by a variable slippage clutch connected by transmission means to said conveying means and adapted to slip in proportion to the amount of tape filling said rotatable storing means so that the speed of said continuous strip through said apparatus will remain substantially constant.

9. Apparatus for continual sampling of moist material and detecting the radioactivity thereof comprising an endless conveyor belt having indented receptacles arranged in tandem at regularly spaced intervals, means for sampling selected volumes of said moist material from a continuously moving supply thereof, said sampling means including a dispensing pump for filling each receptacle with said selected volume of moist material, a drier for removing the moisture from said material, at least one radiation detector for detecting and measuring radioactivity of said sample after the moisture has been removed, a washing device for cleaning said belt and removing said samples therefrom which have passed through the sensing field of said detector whereby said belt is continuously decontaminated of radioactive material and prepared for receiving fresh samples from said sampling means, and means for sequentially actuating said sampling means in synchronism with the movement of said endless strip so that said receptacles are filled by said sampling means in proper time relationship.

10. Apparatus for continual sampling of material and detecting selected properties thereof, comprising means for selectively sampling discrete portions of material from a supply of said material, a detector for detecting a selected property of said sampled material, means for continuously conveying said samples past said detector so that the selected property of said samples may be detected, said conveying means including a continuous strip of receptacle-forming material, means for indenting said strip at spaced intervals to form receptacles therein, said sampling means including means for filling said indentations with said discrete portions of sampled material, and means connected to said detector for operating a device for indicating when said detected properties exceed a predetermined magnitude.

11. Apparatus for continual sampling of material and detecting selected properties thereof comprising means for selectively sampling discrete portions of material from a moving supply of said material, a detector for detecting a selected property of said sampled material, a continuous strip of receptacle-forming material, means for indenting said strip to form receptacles therein, said sampling means including means for filling said indentations with said samples of discrete portions of material, and driving means for advancing said continuous strip past said indenting means, said filling means and said detecting means in that order, and at least one pair of rollers positioned adjacent said detector and having said continuous strip threaded therebetween and adapted to flatten said indentations after said continuous strip is moved past said detector by said driving means.

References Cited in the file of this patent

UNITED STATES PATENTS

| | | |
|---|---|---|
| 1,675,049 | Perkins | June 26, 1928 |
| 2,287,808 | Lehde | June 30, 1942 |
| 2,302,996 | Lilligren | Nov. 24, 1942 |
| 2,530,306 | Land | Nov. 14, 1950 |
| 2,681,571 | Becker | June 22, 1954 |

OTHER REFERENCES

The Review of Scientific Instruments, vol. 17, No. 7 July 1946, pp. 255–261.